United States Patent [19]

Nakao et al.

[11] Patent Number: 4,909,810

[45] Date of Patent: Mar. 20, 1990

[54] VAPOR PERMSELECTIVE MEMBRANE

[75] Inventors: Makoto Nakao; Yoshio Sugaya; Hiroshi Mori; Hirofumi Horie; Hirokazu Wakabayashi, all of Yokohama, Japan

[73] Assignee: Asahi Glass Company Ltd., Tokyo, Japan

[21] Appl. No.: 301,826

[22] Filed: Jan. 26, 1989

[30] Foreign Application Priority Data

Jan. 26, 1988 [JP] Japan .................................. 63-13516
Mar. 13, 1988 [JP] Japan .................................. 63-62018

[51] Int. Cl.$^4$ ............................................. B01D 53/22
[52] U.S. Cl. ........................................ 55/16; 55/68; 55/158
[58] Field of Search ............................ 55/16, 68, 158

[56] References Cited

U.S. PATENT DOCUMENTS

| | | | |
|---|---|---|---|
| 3,735,558 | 5/1973 | Skarstrom et al. | 55/16 |
| 3,735,559 | 5/1973 | Salemme | 55/16 |
| 3,738,813 | 6/1973 | Esmond | 55/158 X |
| 4,497,640 | 2/1985 | Fournié et al. | 55/16 |
| 4,515,761 | 5/1985 | Plotzker | 55/16 X |
| 4,612,019 | 9/1986 | Langhorst | 55/16 |
| 4,732,586 | 3/1988 | Dick et al. | 55/16 X |
| 4,741,744 | 5/1988 | Wu et al. | 55/16 |
| 4,783,201 | 11/1988 | Rice et al. | 55/16 |

FOREIGN PATENT DOCUMENTS

| | | | |
|---|---|---|---|
| 0122049 | 10/1984 | European Pat. Off. | 55/158 |
| 0159783 | 10/1985 | European Pat. Off. | 55/16 |
| 0192143 | 8/1986 | European Pat. Off. | |
| 0235051 | 9/1987 | European Pat. Off. | |
| 52-000788 | 1/1977 | Japan | 55/16 |
| 60-238119 | 11/1985 | Japan | 55/158 |
| 61-187918 | 8/1986 | Japan | 55/16 |
| 61-229830 | 10/1986 | Japan | 55/16 |
| 62-7417 | 1/1987 | Japan . | |
| 62-042723 | 2/1987 | Japan | 55/16 |
| 62-192589 | 8/1987 | Japan | 55/16 |
| 63-209730 | 8/1988 | Japan | 55/16 |
| 63-209731 | 8/1988 | Japan | 55/16 |
| 63-236517 | 10/1988 | Japan | 55/16 |
| 2139110 | 11/1984 | United Kingdom | 55/16 |

*Primary Examiner*—Robert Spitzer
*Attorney, Agent, or Firm*—Oblon, Spivak, McClelland, Maier & Neustadt

[57] ABSTRACT

A vapor permselective membrane consisting essentially of an ion exchange membrane made of a fluorine-containing polymer having a fixed ion concentration of from 1 to 6N, a water content of from 20 to 250% by weight and an ion exchange capacity of from 0.6 to 2.5 meq/g dry resin, the ion exchange membrane having a thickness of from 0.1 to 300 $\mu$m and a moisture content of from 1 to 10% by weight, the permselective membrane having a water vapor permeation rate of at least 50 m$^3$/m$^2$.atm.

15 Claims, 2 Drawing Sheets

VAPOR PERMSELECTIVE MEMBRANE

The present invention relates to a (water) vapor permselective membrane and a method for selectively permeating and separating a certain specific component from a fluid mixture by means of the membrane. More particularly, it relates to a permselective membrane and a method for selectively permeating and separating water or water vapor from a moisture-containing gas by means of an ion exchange membrane, for the production of moisture-reduced (-controlled) air for air conditioning of buildings or for compressed air for various meters (instruments), or for removal of moisture from a natural gas, or for the production of a moisture-controlled gas useful in a wide range of fields including chemical industries, electric and electronic industry, precision machine industry, food industry and fiber industry.

Conventional methods for removing water vapor from air may be classified into the following four categories:

(1) Compression method
(2) Cooling method
(3) Adsorption method
(4) Membrane separation method The compression method (1) is a method wherein the dewpoint temperature is raised by compression, followed by e.g. cooling to condense and remove water vapor. However, this method has a drawback that in order to reduce the relative humidity, it is required to heat the gas again or to reduce the compression, whereby an excessive energy is required.

The cooling method (2) is a method wherein the gas is cooled to reduce the saturated water vapor pressure and to condense and remove the supersaturated water vapor in the form of water or ice. This method is used for an air conditioning apparatus for cooling in buildings where two functions i.e. cooling of air and removal of moisture are required. However, the cooled air having the moisture removed, has a high relative humidity, and in order to reduce the relative humidity, it is necessary to raise the temperature of the air prior to use, and this temperature control requires a substantial amount of energy, such being disadvantageous.

The adsorption method (3) is a method wherein a gas is brought in contact with a moisture adsorbing agent such as silica gel, molecular sieve, concentrated sulfuric acid or glycerol, to remove moisture in the gas. However, the moisture adsorbing capacity of such an adsorbing agent is limited, and it is impossible to conduct a continuous operation by a single dryer. Besides, an operation for regenerating the moisture adsorbing agent is required. Further, it is likely that the moisture adsorbing agent is included in the gas, thus leading to a deterioration of the purity of the gas or to a loss of the treated gas during the regeneration operation.

The membrane separation method (4) is a method wherein a moisture-containing gas is contacted to one side of a membrane, and the moisture is selectively permeated and separated from the other side of the membrane. In principle, this method is advantageous over the above mentioned three methods in that the running cost is low, the construction of the apparatus is simple, and a dry gas can be obtained continuously without contamination of the gas. However, this method has not practically been in use, since no membrane has been available which has excellent water vapor permeability.

For example, Japanese Unexamined Patent Publications No. 86684/1978, No. 97246/1978, No. 11481/1979, No. 152679/1979, No. 261503/1985, No. 42722/1987 and No. 42723/1987 disclose water-absorptive polymer membranes, and water vapor permselective membranes made of membrane materials which are used for the separation of oxygen or hydrogen. However, they are inadequate in the water vapor permeability or in the separation constant of water vapor/gas.

On the other hand, a perfluoro ion exchange membrane having sulfonic acid groups in its side chains, which is used as a diaphragm for a fuel cell or as a diaphragm for electrolysis, has a high water adsorptivity and a high permeation rate of water in the polymer, and it is considered effective as a material for a water vapor permselective membrane. In this respect, a moisture-removing (dehydration) device by means of hollow tubes made of a perfluorosulfonic acid, is disclosed in U.S. Pat. No. 3,735,558 and is available a Permapure Dry ®. However, this device has a small water vapor permeability and may not be substituted for the conventional cooling method or adsorption method in an industrial application where a large amount of gas is to be treated.

Further, Japanese Unexamined Patent Publication No. 7417/1987 discloses a moisture-removing membrane for producing a gas having a low dewpoint temperature, which is prepared by heat-treating hollow fiber of a perfluorosulfonic acid at a temperature of from 70° 200° C. However, this membrane has a drawback that the water vapor permeability is remarkably reduced since the water content in the membrane is removed by the heat-treatment.

Furthermore, Japanese Examined Patent Publication No. 39014/1985 and Japanese Unexamined Patent Publications No. 151558/1981 and No. 151559/1981 disclose a laminated material of a perfluoro ion exchange membrane with a porous supporting substrate. However, such a laminated material is directed to the production of a water vapor permselective clothing, and it is different in its object from the vapor permselective membrane of the present invention and its moisture permeability is not so high.

It is an object of the present invention to solve the above-mentioned problems inherent to the conventional techniques and to provide a vapor permselective membrane, particularly a moisture-removing membrane, having a high water vapor permeation rate and a high separation factor of water vapor.

It is another object of the present invention to provide a vapor permselective membrane which is useful not only as a substitute for the conventional techniques for the production of compressed air for air conditioning apparatus or meters, but also for the removal of moisture from natural gas or from a corrosive gas to which the conventional techniques can not be employed.

The present invention provides a vapor permselective membrane consisting essentially of an ion exchange membrane made of a fluorine-containing polymer having a fixed ion concentration of from 1 to 6 meq/g $H_2O$, a water content of from 20 to 250% by weight and an ion exchange capacity of from 0.6 to 2.5 meq/g dry resin, said ion exchange membrane having a thickness of from 0.1 to 300 μm and a moisture content of from 1 to 10% by weight, said permselective membrane having a water vapor permeation rate of at least 50 $m^3/m^2$.atm. Preferably, the vapor permselective membrane has a water vapor permeation rate of at least 80 m³/m².hr.atm and a selective permeation constant of water vapor/nitrogen of at least 5,000, more preferably at least 10,000.

The vapor permselective membrane of the present invention is basically the one having the fixed ion concentration, the water content, the ion exchange capacity and the thickness of the ion exchange membrane controlled to be within the above-mentioned specific ranges.

As mentioned above, conventional ion exchange membranes are useful as moisture-removing membranes, but their water vapor permeability is small and inadequate.

The present inventors have conducted extensive researches for membranes which are capable of selectively permeating water vapor in a gas, as vapor permselective membranes, particularly as moisture-removing membranes. As a result, they have found that ion exchange membranes which are different in the construction and physical properties from the conventional ion permselective ion exchange membranes, are very effective as moisture-removing membranes. The present invention has been accomplished on the basis of this discovery.

Now, the present invention will be described with reference to the preferred embodiments.

Figure 1:
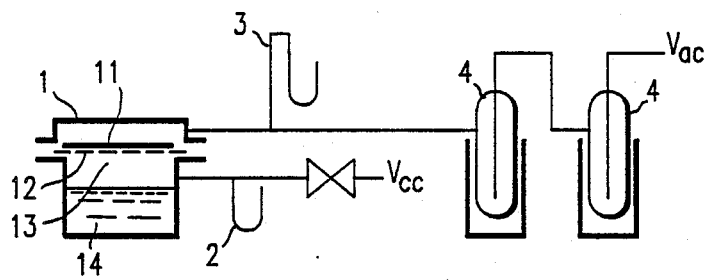
FIG. 1 is a diagrammatical view of an apparatus for measuring the water vapor permeation rate.

The ion exchange membrane used for the permselective membrane of the present invention has a fixed ion concentration of from 1 to 6 meq/g $H_2O$. The fixed ion concentration meq/g $H_2O$ (N) is the milliequivalent of ion exchange groups per 1 g of water absorbed by the membrane. The development of conventional permselective ion exchange membranes has been directed to increase the fixed ion concentration from Donan's equilibrium of selective ion permeability, and it has been common to employ preferably a fixed ion concentration of higher than 6 meq/g $H_2O$. From the study by the present inventors, it has now been found that as a vapor permselective ion exchange membrane, the fixed ion concentration should be from 1 to 6 meq/g $H_2O$, preferably from 2 to 5 meq/g $H_2O$ for the balance of the water vapor permeation rate and the water vapor separation constant, since if the fixed ion concentration exceeds 6 meq/g $H_2O$, the water vapor permeation rate remarkably decreases, and if it is less than 1 meq/g $H_2O$, the water vapor permeation rate and the separation factor of water vapor tend to decrease.

Here, the separation factor ($\alpha$) of water vapor is a ratio of the permeation rate of water vapor to the permeation rate of other gas such as nitrogen, oxygen, methane, etc.

The reason why the fixed ion concentration is important to the permeability of water vapor is not clearly understood but may probably be explained as follows.

Water in the ion exchange membrane is different in its nature from usual water, due to the interaction with ion exchange groups. Depending upon the intensity of the interaction, it is believed to be present in the form of non-frozen water, bound water and free water. When the fixed ion concentration is higher than 6N, adsorbed water is firmly bonded to ion exchange groups, whereby the mobility of water in the membrane decreases. On the other hand, if the fixed ion concentration is less than 1N, free water will be substantial, and other gasses will permeate through the free water layer, whereby the water vapor separation constant will be low.

Further, a surprising fact has been found that when a double-layered membrane comprising two layers having different fixed ion concentrations, is used, the water permeation rate is higher than that attainable by the use of each layer independently, even though the thickness is greater with the double-layered structure.

The reason why the water vapor permeability is improved with the double-layered membrane having different fixed ion concentrations, is not clearly understood, but may probably be explained as follows.

Namely, the water vapor permeation rate is governed by the following three steps. In the first step, it is influenced by the rate of dissolution and adsorption of water vapor into the membrane surface. In the second step, it is influenced by the diffusion rate of water vapor in the membrane. In the third step, it is influenced by the desorption rate of water vapor from the surface of the permeated side of the membrane.

A membrane having a low fixed ion concentration i.e. a membrane having a large water absorptivity per ion exchange group, has a high water vapor dissolving and adsorbing rate and a high water vapor diffusion rate in the membrane. However, such a membrane brings about a decrease of the desorption rate of water vapor, since it has a high water absorptivity. On the other hand, a membrane having a high fixed ion concentration has, as compared with the membrane having a low fixed ion concentration, a low dissolution and adsorption rate of water vapor into the membrane and a low diffusion rate in the membrane although the desorption rate of water vapor is high, whereby the water vapor permeation rate is low. Accordingly, with the double-layered structure having different fixed ion concentrations, it is possible to obtain a membrane having a higher water vapor permeation rate than a single-layered membrane, by contacting water vapor to the side where the water absorptivity is high, to improve the dissolution and adsorption rate of water vapor into the membrane surface, while desorbing water vapor from the side where the water absorptivity is low. However, it should be understood that this explanation is given merely to help understand the present invention and by no means restricts the present invention.

In the double-layered vapor permselective membrane of the present invention, the first ion exchange layer has a fixed ion concentration of at most 6 meq/g $H_2O$ and a water content of at least 20% by weight. On the other hand, the second ion exchange layer of the double-layered membrane of the present invention, has a fixed ion concentration larger by at least 0.5 meq/g $H_2O$ than the first ion exchange layer and a water content of at least 15% by weight. If the difference in the fixed ion concentration is less than 0.5 meq/g $H_2O$, the effect for the improvement of the water vapor permeation rate is not remarkable. Therefore, ion exchange layers are selected so that the difference in the fixed ion concentration is at least 0.5 meq/g $H_2O$, preferably at least 1.0 meq/g $H_2O$, and the average ion exchange group concentrations of the first and second layers are at most 6 meq/g $H_2O$. Further, even when the difference in the fixed ion concentration is as defined above, if the water content is low, the amount of the water vapor released from the membrane will be low, and the water vapor permeation rate will accordingly be low. Therefore, it is preferred to use an ion exchange membrane layer having a water content of at least 15% by weight, preferably from 20 to 250% by weight, more preferably from 25 to 100% by weight, as the second layer of the double-layered vapor permselective membrane of the present invention.

In the present invention, in addition to the requirement that the fixed ion concentration is from 1 to 6N, the ion exchange membrane is required to have a water content and an ion exchange capacity within certain ranges in order to obtain a membrane having a high water vapor permeation rate and a high separation factor of water vapor. If the water content is less than 20% by weight, the water vapor permeation rate tends to be low. On the other hand, if it exceeds 250% by weight, the dimensional stability of the membrane, i.e. the membrane-form maintaining capability, tends to be impaired. Therefore, the water content is from 20 to 250% by weight, preferably from 25 to 100% by weight, to obtain practical strength for the preparation of a module from this membrane and for use of such a module.

On the other hand, the ion exchange capacity is from 0.6 to 2.5 meq/g dry resin, preferably from 1.06 to 2.5 meq/g dry resin, more preferably from 1.1 to 2.0 meq/g dry resin, in order to obtain a membrane having a high water vapor permeation rate and a high separation factor of water vapor and to obtain a polymer having high membrane strength. Even with a membrane having an ion exchange capacity of less than 1.0, it is possible to obtain a fixed ion concentration of from 1 to 6N and a water content of at least 20% by weight as defined by the present invention. However, it is preferred that the amount of ion exchange groups is substantial with an ion exchange capacity of at least 1.06, in view of the water vapor permeability.

In the present invention, the thickness of the ion exchange membrane is also important for the selective permeation and separation of water vapor by means of the ion exchange membrane having a fixed ion concentration, a water content and an ion exchange capacity within the above-mentioned specific ranges. It is interesting that with the vapor permselective ion exchange membrane of the present invention, the water vapor permeability is not inversely proportional to the membrane thickness, and it is represented by the following equation.

$$Q=(\alpha t+p')/t$$

where Q: water vapor permeation rate, t: membrane thickness, p': permeation constant when the membrane thickness is 0 μm, α: dependency of the permeation constant on the membrane thickness (value specific to the membrane).

Therefore, even if the membrane thickness increases, the decrease in the permeation is relatively small, and even if the membrane thickness decreases, no remarkable increase in the permeation is observed unless the thickness is less than a certain level.

On the other hand, the permeation rates of other gasses such as nitrogen and oxygen are inversely proportional to the membrane thickness. Thus, excessive reduction of the membrane thickness is not desirable, since the separation factor of water vapor tends to decrease.

On the other hand, if the membrane thickness is increased too much, there will be a drawback that when a wet gas is subjected to moisture removal, it is difficult to obtain a gas having a low dewpoint temperature even though the water vapor permeation rate is not substantially reduced.

Thus, the thickness of the ion exchange membrane for a vapor permselective membrane should be from 0.1 to 300 μm, preferably from 0.5 to 100 μm, more preferably from 1 to 50 μm from the viewpoint of the water vapor permeation rate, the separation constant and the production of a gas having a low moisture content.

The reason why a gas having a low moisture content is hardly obtainable with an ion exchange membrane having an increased thickness, is not clearly understood, but may probably be explained as follows.

The ion exchange membrane prior to its use as a moisture removing device, usually has a water content in an equilibrium state with air having a moisture content of from 10 to 80%. When such a membrane is assembled into a moisture removing device, and a wet gas is contacted to one side and dry air is contacted to the other side or the pressure is reduced at the other side to permeate water vapor to dry the wet gas, if the membrane is too thick, water contained prior to the use remains in the membrane, whereby it is difficult to obtain a gas having a low moisture content. However, this explanation is given merely to help understand the present invention and by no means restricts the present invention.

Thus, as the ion exchange membrane to be used in the present invention, any membrane may be used without any particular restriction so long as it has the above-mentioned physical properties with respect to the fixed ion concentration, the water content, the ion exchange capacity and the membrane thickness. As the type of the ion exchange groups, there may be mentioned cation exchange groups such as sulfonic acid groups, sulfonate groups, carboxylic acid groups, carboxylate groups, phospholic acid groups, phosphate groups, acidic hydroxyl groups or salts of acidic hydroxyl groups, and anion exchange groups such as primary to tertiary amino groups or quarternary ammonium groups. Among them, sulfonic acid groups are particularly preferred since they provide a high water content and excellent heat resistance and chemical resistance, and the ion exchange membrane of the present invention can thereby be readily produced.

The material for such a sulfonic acid membrane may be any material without any particular restriction, such as a polystyrene resin, a polyethylene resin, a polysulfone resin or a fluorine-containing resin. However, in view of the heat resistance, chemical resistance and molding processability, a sulfonic acid membrane made of a fluorine-containing resin, particularly a fluorine-containing copolymer having repeating units of the following formula, is preferred:

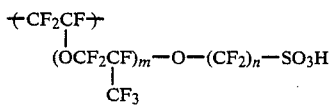

wherein m is 0 or 1, and n is an integer of from 2 to 5.

As the above-mentioned fluorine-containing copolymer, it is preferred to employ a copolymer obtained by copolymerizing a fluorinated olefin such as tetrafluoroethylene, trifluoroethylene, vinylidene fluoride or vinyl fluoride with a —SO$_2$F group-containing perfluoro vinyl ether having the formula:

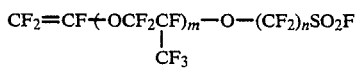

wherein m is 0 or 1, and n is an integer of from 2 to 5. Further, if necessary, a third component such as ethylene, propylene, perfluoroacetone, perfluorovinyl ether, perfluorodivinyl ether or perfluoroallyl vinyl ether, may be incorporated.

The proportions of the components containing the above copolymer are selected so that the fluorine-containing copolymer will have an ion exchange capacity of from 1.06 to 2.5 meq/g dry resin.

As a vapor permselective membrane of the present invention, such a copolymer may be formed into a flat membrane form, a tubular form or a hollow fiber form by known methods. However, it is preferred to have such a membrane laminated with a porous material from the viewpoint of the pressure resistance and the moldability into a module. Such lamination may sometimes be particularly preferred to obtain a vapor permselective membrane having high permeability with a thickness of not more than 30 μm.

The porous material to be used in the present invention preferably has a thickness of from 10 to 500 μm, more preferably from 50 to 300 μm. Specifically, the porous material is selected in consideration of the balance of various properties such as the surface smoothness, the heat resistance, the chemical resistance and the mechanical strength of the porous layer in view of the lamination condition with the ion exchange resin layer and the condition for use as a vapor permselective membrane. For example, from the viewpoint of the moldability of a thin membrane of an ion exchange resin, a porous material having a high level of surface smoothness and a small pore size is preferred. When the lamination is conducted by heat fusion, the porous layer preferably has heast resistance at a temperature of at least 100° C. Further, in a case where the ion exchange resin layer is cast from a solution, a porous layer having chemical resistance is preferred. Further, in a case where a pressure is exerted to the membrane due to the operational condition, the porous material is selected from materials having excellent mechanical strength, particularly excellent deformation resistance against pressure. A woven fabric having a porosity of from 5 to 70%, a pore diameter of from 0.1 to 100 μm and a thickness of from 50 to 500 μm is preferably used. A fine porous membrane having a porosity of from 30 to 90%, a pore diameter of from 0.01 to 10 μm and a membrane thickness of from 10 to 500 μm is preferably used. Specifically, a polypropylene non-woven fabric, a polyester non-woven fabric, a nylon non-woven fabric as well as a porous polyethylene, a porous propylene or a porous tetrafluoroethylene prepared by stretching and having a fine structure comprising nodes formed by the mutual bonding of fine fibers, are particularly preferred from the viewpoint of the physical properties such as mechanical strength, dimensional stability, chemical resistance and heat resistance and from the viewpoint of the availability and the price of the material. A laminated porous material comprising a fine porous membrane and a woven fabric, or a fine porous material and a non-woven fabric, is preferred since the moldability of a thin membrane of the ion exchange resin will thereby be excellent and the pressure resistance will thereby be excellent.

In the present invention, the porous material is preferably hydrophilic. It is preferably hydrophilic at least at the surface portion i.e. at least at the exposed portion. The reason why the porous material is preferably hydrophilic is not clearly understood. However, as will be evident from the Examples given hereinafter, when a porous material having no hydrophilic nature is employed, the water vapor permeation rate decreases to a level of ⅓ to ¼. Whereas, when a porous material coated with a hydrophilic layer is employed, the water vapor permeation rate increases as much as 5 times.

Thus, in the present invention, when the porous material itself has no hydrophilic nature, the hydrophilic nature may be imparted to its surface before or after the lamination with the ion exchange resin layer. The hydrophilic nature may be imparted preferably by coating a hydrophilic layer of e.g. a surfactant, a water-soluble polymer or a water-absorptive polymer thereon, whereby the durability and the water vapor permeation rate by virtue of the hydrophilic layer will be improved in a substantial extent. It is preferred to coat the porous material with an ion exchange resin having a water content of at least 20% by weight. Such a hydrophilic layer may preferably be produced by a method wherein an ion exchange resin monomer is impregnated to the porous material, followed by polymerization to cover the inner walls of pores of the porous material, or a method wherein a solution of an ion exchange resin is impregnated in the pores, followed by drying, from the viewpoint of the efficiency of the production. The hydrophilic layer covering the inner walls of the pores is formed to such an extent that it occupies from 0.1 to 50% by volume of the total pore volume of the porous material. If the amount is less than 0.1% by volume, no adequate effect for the improvement of the water vapor permeability is obtainable. On the other hand, if the amount exceeds 50% by volume, the pores of the porous layer tend to be closed, thus leading to a decrease of the permeability. Preferably, the hydrophilic layer is formed in an amount of from 0.5 to 10% by volume of the total pore volume.

The porous material and the ion exchange membrane may be combined in such a manner that the ion exchange resin is formed into a membrane, which is then laminated with the porous material, or the ion exchange resin is formed into a solution, a suspension or an emulsion polymerized latex or an organic solvent type dispersion obtained by substituting water of such an emulsion polymerized latex by an organic solvent, which is then impregnated to the porous material, followed by drying.

Particularly when a hollow porous material is used, it is possible to obtain a vapor permselective hollow fiber having high permeability by impregnating the above-mentioned resin-containing solution to the hollow porous fiber material, followed by drying.

If the membrane thus obtained has not yet been treated to have ion exchange groups, it is hydrolyzed with an alkaline solution, followed by immersion in an acidic solution to obtain a sulfonic acid type vapor permselective membrane.

In order to bring the fixed ion concentration and the water content of the ion exchange membrane to the ranges specified by the present invention, the condition for the hydrolysis of the membrane, the condition for the treatment with the acidic solution and, in the case where sulfonic acid resin solution is coated by casting, the condition for drying, become important in many cases.

If the ion exchange capacity is at a level of about 1.1 meq/g dry resin, a vapor permselective membrane of the present invention can be obtained by the hydrolysis with a 10-20 wt% alkaline aqueous solution, followed by conversion to an acid type with a 0.1-5N acidic aqueous solution, washing with water at room temperature and drying in air. In a case where the ion exchange membrane is cast from a sulfonic acid polymer solution, it is preferred to conduct drying and heating treatment at a temperature of not higher than 100° C.

When the ion exchange capacity is at a level of at least 1.5 meq/g dry resin, the membrane after the hydrolysis, conversion to an acid type and washing treatment with water, may be heated at a temperature of at least 50° C., preferably at least 100° C. In any case, it is possible to obtain a vapor permselective membrane having a water vapor permeation rate of at least 50 $m^3/m^2 \cdot atm$, preferably at least 80 $m^3/m^2 \cdot atm$, a separation factor constant of water vapor/nitrogen of at least 5,000, preferably 10,000 and high strength, by suitably selecting the treating conditions so that the ion exchange membrane has the fixed ion concentration and the water content as defined by the present invention.

Furthermore, in the present invention, it has been found possible to increase the permeation rate without impairing the selective permeability by roughening the surface of the ion exchange membrane. The reason why the water vapor permeation rate can be increased by such surface roughening is not clearly understood, but may probably be explained as follows.

Namely, the permeation rate of a gas is governed by the following three steps. In a first step, it is influenced by the dissolution and adsorption rate of the gas into the membrane surface. In the second step, it is influenced by the diffusion permeation rate of the gas in the membrane. In the third step, it is influenced by the desorption rate of the gas from the surface of the permeated size of the membrane. The permeation rates of gasses such as hydrogen, helium, nitrogen and oxygen are inversely proportional to the thickness of the ion exchange membrane. If the thickness is made one half, the permeation rate increases as much as twice. Therefore, the permeation rates of these gasses are practically governed by the diffusion permeation rates within the membrane. However, in the case of a condensable gas such as water vapor, the permeation rate is not inversely proportional to the thickness of the membrane. Particularly in the case of a membrane containing hydrophilic groups such as ion exchange groups, the reduction in the water vapor permeation rate is slight even when the membrane thickness is increased. Therefore, the water vapor permeation rate is not controlled by the diffusion permeation rate within the membrane but rather governed by the dissolution and adsorption rate at the membrane surface and/or the desorption rate at the membrane surface on the other side. Accordingly, by the roughening of the membrane surface, the surface area increases, and the dissolution and adsorption rate into the membrane surface and the desorption rate of the gas will increase, whereby the permeation rate is increased. However, this explanation is given merely to help understand the present invention and by no means restricts the present invention.

As the membrane having a roughened surface, the one having a roughened surface area being at least 5 times, preferably at least 10 times, the projected area of the surface is preferred. Here, the term "roughened" means a state where the membrane surface is irregular i.e. the membrane surface is not flat and smooth and has fine irregularities. For example, a membrane having "surface roughness of 2 $\mu m$" means that with the surface irregularities of the membrane, the sum of the height of a mountain and the depth of the adjacent valley is 2 $\mu m$ on an average. Further, the "roughened surface area" represents a surface area obtained by measuring the surface length between two points on each of two sides perpendicular to each other by means of a feeler type surface area meter, and multiplying the surface lengths thus obtained.

As a method for obtaining an ion exchange membrane having a roughened surface in the present invention, when the ion exchange membrane or the precursor of the ion exchange membrane has thermoplasticity, a method of transferring may be employed by means of other material having a roughened surface such as a blasted metal plate or roll, a blasted film, a porous metal plate or a porous film.

Further, an ion exchange membrane having a roughened surface may be obtained by mechanically abrading the membrane surface with an abrasive such as sand blasting to obtain a roughened surface, or by chemically roughening under an ionizing atmosphere by e.g. plasma etching or sputtering, or it may be formed by casting a polymer solution or polymerizing a monomer solution on a roughened surface. As another preferred method for producing a roughened surface, a method may be employed wherein soluble particles or fibers are embedded in an ion exchange membrane, or an ion exchange polymer solution containing soluble particles or fibers is coated on an ion exchange membrane, and then the soluble particles or fibers are dissolved to form a roughened surface.

The roughened membrane thus obtained preferably has a surface roughness of from 0.5 to 100 $\mu m$, more preferably from 1 to 50 $\mu m$. The roughened surface preferably has from $10^3$ to $10^{15}$, preferably from $10^5$ to $10^{12}$ irregularities per $cm^2$ of the membrane area, whereby the roughened surface area will be at least five times, preferably at least ten times the projected area (i.e. the surface area of an ideal smooth flat membrane).

If the surface roughness is as large as at least 100 $\mu m$, the permeation of a gas which should not be permeated, tends to increase at recesses where the membrane thickness is minimum, thus leading to a deterioration of the selective permeability or the flowability of the gas to the recesses tends to decrease, whereby a reduction of the permeation rate will be brought about. For the same reason, the ratio of the membrane thickness at the mountain to the membrane thickness at the valley is preferably at most ½.

By contacting a gas containing a condensable gas such as water vapor, ammonia, carbon dioxide or sulfur dioxide to the ion exchange membrane having a roughened surface and contacting a dry gas on the other side or reducing the pressure at the other side, such a condensable gas can selectively be permeated. The roughened surface of the roughened ion exchange member may be at either the feed gas mixture side or the permeated gas side. However, in many cases, it is preferred that both surfaces are roughened. Particularly when a roughened membrane of the present invention is used for the treatment of a gas containing water vapor as a condensable gas, it can be used as a moisture removing membrane having the water vapor permeation rate and the separation factor of water vapor improved remarkably over the membrane having a smooth surface.

Further, such a roughened membrane may be used for a multi-layered membrane having at least two layers having different water contents or fixed ion concentrations or for a laminated membrane reinforced with a porous supporting substrate.

Thus, it is possible to obtain a gas having moisture removed by selectively permeating water vapor by contacting a gas containing water vapor, preferably controlled of its temperature less than 20° C., more preferably less than 15° C., on one side of an ion exchange membrane of the present invention, and contacting a dry gas to the other side or reducing the pressure at the other side. However, it is preferred to adjust the moisture content of the membrane prior to the moisture removing operation within a certain specific range with a view to reducing the moisture content of the gas subjected to the moisture removing operation. The ion exchange membrane used in the present invention is usually dried in air prior to the moisture removing operation to bring the moisture content in the membrane to a level of from 1 to 10% by weight. However, as will be apparent from the Examples given hereinafter, it is particularly advisable that such a membrane is dehydrated at a temperature of not higher than the glass transition temperature, preferably not higher than 50° C., preferably not higher than 25° C. to reduce the moisture content in the membrane to a level of from 1 to 10% by weight, particularly by at least 30%, preferably 50%, by weight than the moisture content prior to the dehydration.

Such dehydration can be conducted prior to assembling the moisture removing device. However, it is also possible to conduct such dehydration after the ion exchange membrane is assembled in a moisture removing device and prior to the use of such device by contacting a dry gas to at least one side of the membrane at a temperature of not higher than the glass transition temperature of the membrane, or by reducing the pressure, to obtain a vapor permselective membrane of the present invention having moisture content reduced to a level of from 1 to 10% by weight. Such a method may be carried out by supplying a dry nitrogen gas having a dewpoint temperature of not higher than −40° C. to the moisture removing device at a temperature of not higher than 50° C., preferably not higher than 25° C., or evacuating and drying the moisture removing device under a reduced pressure not higher than 100 mmHg, preferably not higher than 5 mmHg, at a temperature of not higher than 50° C., preferably not higher than 25° C. The temperature control of a gas containing water vapor above-mentioned is highly effective when a hydrated membrane is used.

Now, the present invention will be described in further detail with reference to Examples. However, it should be understood that the present invention is by no means restricted to such specific Examples. In the following Examples, the following methods were used for measuring various properties.

(1) Measurement of water content W

A vapor permselective membrane is immersed in pure water at 25° C. for 16 hours, and its weight is designated as $W_1$. Then, the film is vacuum-dried at 130° C. and the dry weight is designated as $W_2$. The water content W is calculated by the following equation.

$$W = 100(W_1 - W_2)/W_2$$

(2) Calculation of fixed ion concentration $A_w$

The fixed ion concentration $A_w$ is calculated by the following equation:

$$A_w = A_R/(W_1 - W_2) \div W_2$$

where $A_R$ is an ion exchange capacity (meq/g dry resin), and $W_1$ and $W_2$ are as defined above.

(3) Measurement of moisture content M

A vapor permselective membrane is permitted to absorb moisture in air having a relative humidity of 50% at 25° C., and its weight is designated as $W_3$. When the membrane is dehydrated, the membrane is weighed immediately after the hydration and its weight is designated as $W_3$. Then, the membrane is vacuum-dried at 130° C., and the dry weight is designated as $W_4$. The moisture content M is calculated by the following equation:

$$M = 100(W_3 - W_4)/W_4$$

(4) Measurement of water vapor permeation rate Q ($m^3$ (STP)/$m^2$.hr.atm)

By using the apparatus as illustrated in FIG. 1, the permeation rate of water vapor having a purity of 100% is obtained.

In FIG. 1, reference numeral 1 designates a measuring apparatus for permeation of water vapor, numeral 2 designates a manometer for upstream water vapor pressure, numeral 3 designates a manometer for permeate water vapor pressure, numeral 4 designates a cooling trap for collecting water vapor permeate, numeral 11 designates a porous plate for supporting a membrane, numeral 12 designates a test membrane, numeral 13 designates water vapor saturated at given temperature and numeral 14 designates pure water.

(5) Separation factor ($\alpha$) of water

The permeation rate $Q_A$ of gas A is determined by a Seikaken Model gas permeation meter, and the water vapor selective permeation constant $\alpha$ is calculated by the following equation:

$$\alpha_A = Q/Q_A$$

EXAMPLE 1

Tetrafluoroethylene and $CF_2=CFOCF_2(CF_3)O(CF_2)_2SO_2F$ were copolymerized to obtain a copolymer A, which is a precursor of cation exchange resin, having an ion exchange capacity of 1.10 meq/g dry resin.

The copolymer A was formed by melt-extrusion molding into a membrane having a thickness of 30 μm.

The membrane was hydrolyzed with a 20 wt% potassium hydroxide aqueous solution to a potassium sulfonate type and then immersed in 1N hydrochloric acid for conversion to a —$SO_3H$ type. Then, it was washed with water and dried in air.

Then, the air dried membrane was divided into five sheets. The first sheet was non-treated, and the remaining four sheets were, respectively, subjected to hot air drying treatment at a temperature of 100° C. and 150° C. and hydrothermal treatment with pure water at 100° C. and 120° C.

The five types of membranes thus obtained were dried in air, and their water contents, water vapor permeation rates and water vapor/nitrogen selective permeation constants (selectivity) were obtained.

The results are shown in Table 1.

COMPARATIVE EXAMPLE 1

Two types of membranes were prepared in the same manner as in Example 1 except that the hot air drying treatment was conducted at a temperature of 200° C. and 250° C., and the water contents and the water vapor permeability of these membranes were obtained.

Figure 2:
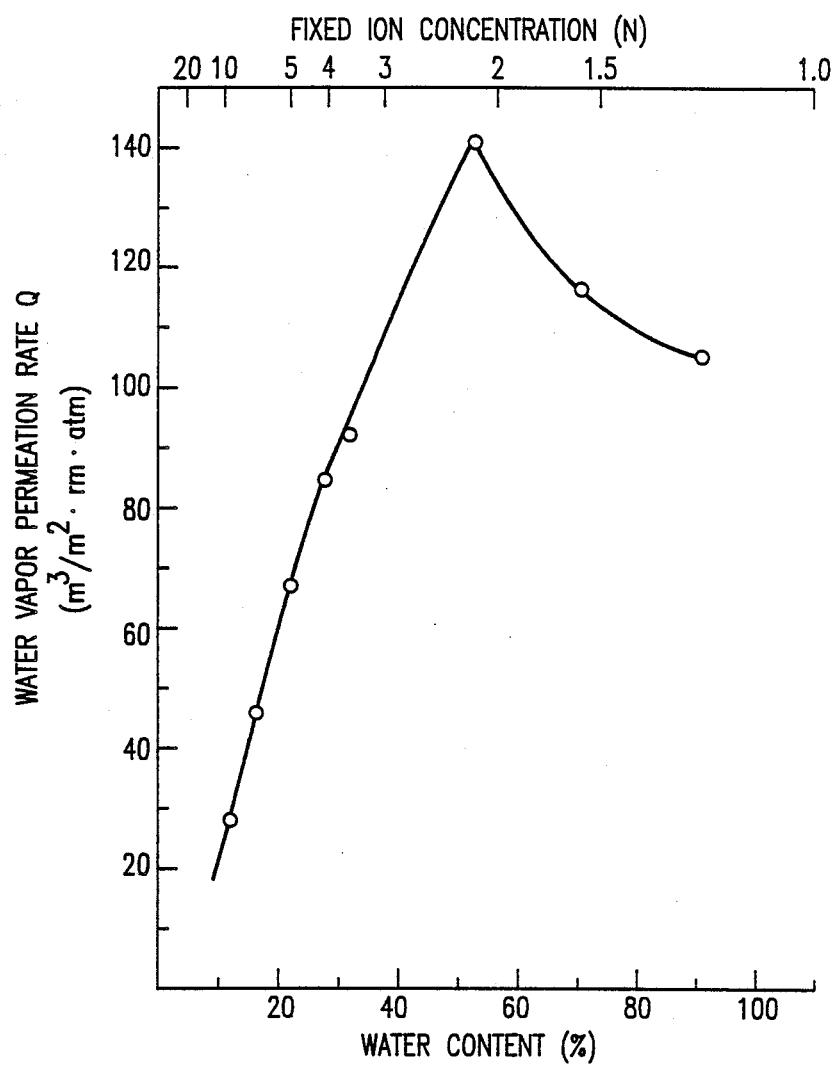
FIG. 2 is a graph showing the relation between the water vapor permeation rate and the fixed ion concentration, and the relation between the water vapor permeation rate and the water content, as obtained from Example 1 and Comparative Example 1.

The results are shown in Table 1 and FIG. 2.

TABLE 1

| Example Nos. | Membrane treatment | Water content (%) | Fixed ion concentration (meq/g $H_2O$) | Permeation rate ($m^3/m^2$.hr.atm) | Selectivity $\alpha_{N2}$ |
|---|---|---|---|---|---|
| Example 1-1 | Simply dried in air | 32 | 3.4 | 92 | $460 \times 10^4$ |
| 1-2 | 100° C. hot air | 28 | 3.9 | 85 | $425 \times 10^4$ |
| 1-3 | 150° C. hot air | 22 | 5.0 | 67 | $270 \times 10^4$ |
| 1-4 | 100° C. hydrothermal | 52 | 2.1 | 140 | $500 \times 10^4$ |
| 1-5 | 120° C. hydrothermal | 70 | 1.57 | 115 | $500 \times 10^4$ |
| 1-6 | 140° C. hydrothermal | 90 | 1.2 | 105 | $350 \times 10^4$ |
| Comparative Example 1-1 | 200° C. hot air | 17 | 6.5 | 45 | $90 \times 10^4$ |
| 1-2 | 250° C. hot air | 12 | 9.2 | 30 | $40 \times 10^4$ |

EXAMPLE 2

The copolymer A obtained in Example 1 was formed by melt-extrusion into membranes having thicknesses of 10 μm, 20 μm, 30 μm, 70 μm, 100 μm and 200 μm. Then, these membranes were hydrolyzed and converted to an acid type in the same manner as in Example 1 to obtain membranes having a water content of 32% by weight and a fixed ion concentration of 3.4 meq/g $H_2O$ (N).

Figure 3:
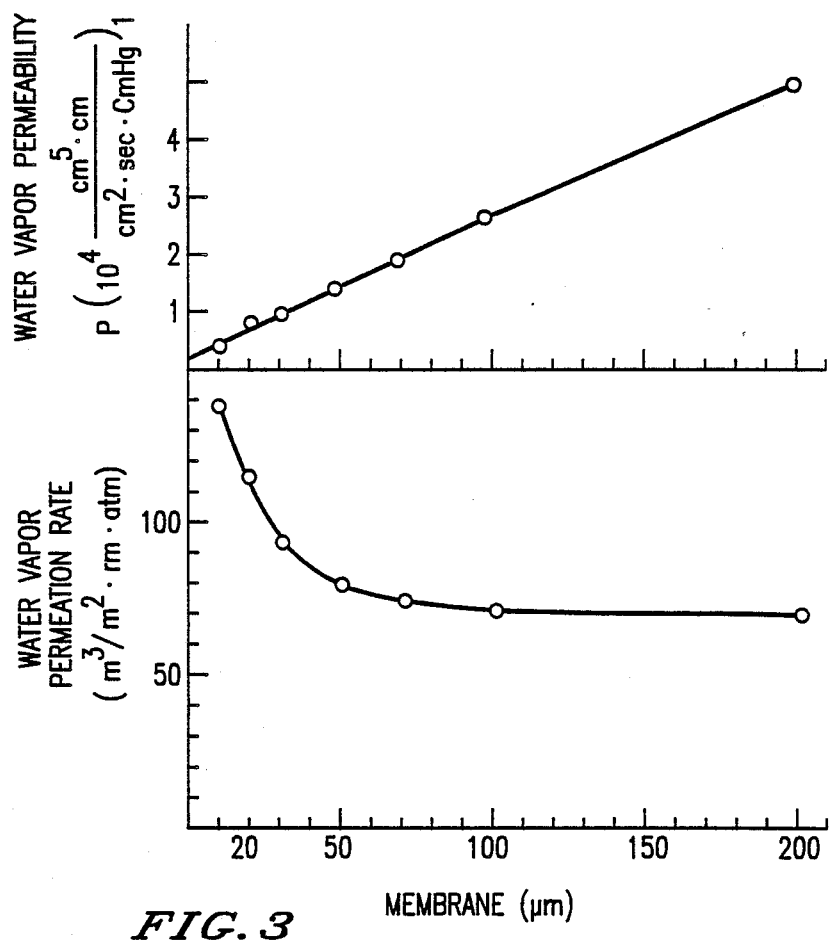
FIG. 3 is a graph showing the relation between the water vapor permeation rate and the thickness of the membrane, and the relation between the water vapor permeability and the thickness of the membrane, as obtained from Example 2.

The water vapor permeation rates of the membranes thus obtained were measured. From the water vapor permeation rates and the membrane thicknesses, the water vapor permeability P ($cm^3.cm/cm^2.sec.cmHg$) was obtained. The results are shown in FIG. 3. From FIG. 3, it is evident that the water vapor permeation rate Q and the membrane thickness t (cm) satisfy the following equation:

$$Q = (60.1t + 0.096)/t$$

and in order to increase the water vapor permeation rate Q, the membrane thickness is preferably at most 100 μm.

EXAMPLE 3

$CF_2=CFOCF_2CF(CF_3)O(CF_2)_2SO_2F$ and tetrafluoroethylene were copolymerized to obtain a copolymer A, which is a precursor of ion exchange resin, having an ion exchange capacity of 1.1 meq/g dry resin and a copolymer B, which is a precursor of ion exchange resin, having an ion exchange capacity of 0.92 meq/g dry resin.

Then, the copolymers A and B were, respectively, formed by melt-extrusion molding into films having a thickness of 40 μm. Then, the film of the copolymer A having a thickness of 40 μm, and the film of the copolymer B having a thickness of 40 μm were laminated by heat rolls to obtain a double-layered membrane (1) having a thickness of 80 μm.

The double-layered membrane (1) thus obtained was converted to a potassium salt type with an aqueous potassium hydroxide solution and then converted to an acid type with an aqueous hydrochloric acid solution. Then, the membrane was divided into two sheets. With one sheet, water vapor was contacted to the copolymer A side of the double-layered membrane. With the other sheet, water vapor was contacted to the copolymer B side. Then, the water vapor permeation rates and the water vapor/nitrogen selective permeation constants (selectivity) of the respective sheets were measured. The results are shown in Table 2. Further, a film of the copolymer A having a thickness of 40 μm and a film of the copolymer B having a thickness of 40 μm were, respectively, i.e. without lamination, subjected to heat roll treatment conversion to the potassium salt type and conversion to the acid type in the same manner as described above, and their water contents and fixed ion concentrations were measured, whereby the copolymer A was found to have a water content of 60.8% by volume and a fixed ion concentration of 3.6 meq/g $H_2O$, and the copolymer B was found to have a water content of 35% by volume and a fixed ion concentration of 5.3 meq/g $H_2O$.

COMPARATIVE EXAMPLE 2

Two sheets of the copolymer A each having a thickness of 40 μm were laminated to obtain a membrane of the copolymer A having a thickness of 80 μm. In the same manner, a double-layered membrane of the copolymer B having a thickness of 80 μm was obtained. Both the double-layered membranes were converted to an acid type in the same manner as in Example 3, and the water vapor permeability was obtained. Further, with respect to 40 μm membranes of the copolymers A and B, the water vapor permeability was obtained in the same manner. The results are shown in Table 2.

TABLE 2

| | Membrane construction Water vapor side/ Permeated side | Water vapor permeation rate Q ($m^3/m^2$.hr.atm) | Water vapor/ nitrogen selectivity |
|---|---|---|---|
| Exam- | Copolymer A 40 μm/ | 98 | $1430 \times 10^4$ |

TABLE 2-continued

| Membrane construction Water vapor side/ Permeated side | | Water vapor permeation rate Q (m³/m². hr.atm) | Water vapor/ nitrogen selectivity |
|---|---|---|---|
| ple 3-1 | Copolymer B 40 μm | | |
| 3-2 | Copolymer A 40 μm/ Copolymer B 40 μm | 72 | 980 × 10⁴ |
| Comparative Example 2-1 | Copolymer A 80 μm | 70 | 930 × 10⁴ |
| 2-2 | Copolymer B 80 μm | 35 | 470 × 10⁴ |
| 2-3 | Copolymer A 40 μm | 84 | 556 × 10⁴ |
| 2-4 | Copolymer B 40 μm | 48 | 320 × 10⁴ |

EXAMPLE 4

$CF_2=CFOCF_2CF(CF_3)O(CF_2)_2SO_2F$ and tetrafluoroethylene were copolymerized to obtain a copolymer having an ion exchange capacity of 1.1 meq/g dry resin.

The copolymer was melt-extruded and heat-pressed with rolls having a roughened surface with a roughness of 5 μm to obtain films having a thickness of 80 μm and a roughness of 5 μm on one side or on both sides.

The films thus obtained were hydrolyzed with an aqueous alkali metal hydroxide solution and then converted to an acid type with an aqueous hydrochloric acid solution. Then, the water vapor permeation rates and the water vapor/nitrogen selective permeation constants of the respective films were obtained. The results are shown in Table 3.

Further, the acid type films had a water content of 60.8% by volume and a fixed ion concentration of 3.6 meq/g $H_2O$. The surface area of the roughened surface was measured and found to be 16 times the projected area.

COMPARATIVE EXAMPLE 3

The operation was conducted in the same manner as in Example 4 except that a membrane having a smooth surface without the roughening treatment was used. The water content and the fixed ion concentration were exactly the same. The results are shown in Table 3.

TABLE 3

| | Arrangement of the membrane for the water vapor permeation test | Water vapor permeation rate Q (m³/m². hr. atm) | Water vapor/ nitrogen selectivity |
|---|---|---|---|
| Example 1-1 | The roughened surface of the one side roughened membrane was located at the water vapor side | 93 | 1200 × 10⁴ |
| 1-2 | The roughened surface of the one side roughened membrane was located at the permeated side | 93 | 1200 × 10⁴ |
| 1-3 | Membrane having both sides roughened | 116 | 1500 × 10⁴ |
| Comparative Examples 1 | Membrane having a smooth surface on both sides | 70 | 930 × 10⁴ |

EXAMPLE 5

Tetrafluoroethylene and $CF_2=CFOCF_2CF(CF_3)O(CF_2)_2SO_2F$ were copolymerized to obtain a precursor copolymer A having an ion exchange capacity of 1.10 meq/g dry resin.

The copolymer A was formed by melt-extrusion into a film having a thickness of 10 μm.

Separately, a mixture of fine powder of polytetrafluoroethylene (hereinafter referred to simply as PTFE) and a liquid lubricant was formed into a film, which was then heated and stretched to obtain a PTFE porous film having a pore diameter of 2 μm, a porosity of 80% and a thickness of 150 μm.

Then, the copolymer A film having a thickness of 10 μm and the PTFE porous film were laminated by heat pressing to obtain a laminated membrane (1).

On the other hand, a film of the copolymer A having a thickness of 10 μm was converted to an acid type, and the water content and the fixed ion concentration were measured and found to be 32% by weight and 3.4 meq/g $H_2O$, respectively.

A 2 wt% ethanol solution of the copolymer A was impregnated to the porous layer of the laminated membrane (1), followed by drying, to obtain a laminated membrane (2) having the inner walls of pores of the porous film coated with the acid type copolymer A.

Then, the laminated membrane (2) was hydrolyzed with a 20 wt% potassium hydroxide aqueous solution and then the copolymer A film having a thickness of 10 μm was converted to a sulfonic acid-$SO_3H$ type with an aqueous hydrochloric acid solution.

The water vapor permeability of the laminated membrane (2) thus obtained was measured by contacting water vapor to the ion exchange layer of the copolymer A. The water vapor permeation rate Q after 120 minutes was 170 m³/m².hr.atm, and the water vapor/nitrogen selective permeation constant $a_{N2}$ was 170×10⁴.

COMPARATIVE EXAMPLE 4

The copolymer A film and the laminated membrane (1) obtained in Example 5 were hydrolyzed and converted to an acid type, and the water vapor permeabilities were measured, in the same manner as in Example 5. After 120 minutes, the copolymer A film had Q of 137 m³/m².hr.atm and $a_{N2}$ of 137×10⁻⁴.

On the other hand, the laminated membrane (1) having no hydrophilic layer in the inner walls of pores of the porous layer had Q of 53 m²/m².hr.atm upon expiration of 30 minutes from the initiation of the measurement, and Q decreased to 37 m³/m².hr.atm upon expiration of 120 minutes. $a_{N2}$ was 37×10⁻⁴.

EXAMPLE 6

The precursor copolymer A having an ion exchange capacity of 1.10 meq/g dry resin obtained in Example 1 was formed by melt-extrusion molding into hollow fibers. The hollow fibers were hydrolyzed and converted to an acid type in the same manner as in Example 1 to obtain hollow fibers having an inner diameter of 220 μm and an outer diameter of 340 μm. The hollow fibers of 500 thus obtained were assembled in an outer cylinder having an inner diameter of 1.5 cm and a length of 50 cm to obtain a hollow fibers module.

Air having a relative humidity of 50% at 10° C. was permitted to flow inside the hollow fibers of the hollow fiber module thus obtained, at a rate of 13 l/min under a predetermined pressure. The air having the moisture removed through the hollow fibers, is returned to the atmosphere, and 20% by volume thereof was purged to the outer cylinder side i.e. outside the hollow fibers. The relation between the dewpoint of the air from which the moisture was removed and the pressure of the air sent to the module is shown in Table 4.

EXAMPLE 7

Dry nitrogen having a dewpoint of −60° C. was supplied to the inside and outside of the hollow fibers of the hollow fiber module obtained in Example 6, at 10° C. for two days to dry the hollow fiber membranes. The hollow fiber module thus obtained was used for the removal of the moisture from the air having a relative humidity of 50% at 10° C. in the same manner as in Example 6. The results are shown in Table 4. Whereas, prior to the drying treatment, the hollow fibers had a moisture content of 8% by weight, and the moisture content of the hollow filaments after the nitrogen drying was 2% by weight.

TABLE 4

| | Dewpoint temperature of moisture-removed air Pressure of Air sent to the module | | |
|---|---|---|---|
| | 3 kg/cm$^2$ | 5 kg/cm$^2$ | 7 kg/cm$^2$ |
| Example 6 | −22° C. | −30° C. | −40° C. |
| Example 7 | −40° C. | −50° C. | −60° C. |

EXAMPLE 8

After the operation of Example 7, the hollow fiber module was released and left in air having a relative humidity of 30–50% at room temperature for one week. Then, it was used for the removal of the moisture from air having a relative humidity of 50% at 10° C. in the same manner as in Example 6, whereby dry air having a dewpoint of −60° C. was obtained by supplying compressed air of 7 kg/cm$^2$. The operation was continued for one week, and no change was observed in the dewpoint of the dried air.

We claim:

1. A vapor permselective membrane consisting essentially of an ion exchange membrane made of a fluorine-containing polymer having a fixed ion concentration of from 1 to 6 meq/g H$_2$O, a water content of from 20 to 250% by weight and an ion exchange capacity of from 0.6 to 2.5 meq/g dry resin, said ion exchange membrane having a thickness of from 0.1 to 300 μm and a moisture content of from 1 to 10% by weight, said permselective membrane having a water vapor permeation rate of at least 50 m$^3$/m$^2$·atm.

2. The permselective membrane according to claim 1, which is obtained by dehydrating the fluorine-containing polymer constituting the ion exchange membrane at a temperature of not higher than the glass transition temperature of the polymer.

3. The permselective membrane according to claim 2, wherein the moisture content is reduced by at least 30% as compared with the moisture content prior to the dehydration.

4. The permselective membrane according to claim 1, wherein the ion exchange membrane is made of a fluorine-containing polymer having a fixed ion concentration of from 1 to 6 meq/g H$_2$O, a water content of from 20 to 250% by weight and an ion exchange capacity of from 1.06 to 2.5 meq/g dry resin, and has a thickness of from 0.1 to 100 μm and a moisture content of from 1 to 10% by weight, and the permselective membrane has a water vapor permeation rate of at least 50 m$^3$/m$^2$·atm and a selective permeation constant of water vapor/nitrogen of at least 5,000.

5. The permselective membrane according to claim 1, wherein the ion exchange membrane comprises at least two layers of a first ion exchange layer having a small fixed ion concentration and a second ion exchange layer having a fixed ion concentration higher than the first ion exchange layer.

6. The permselective membrane according to claim 5, wherein each of the first and the second ion exchanger layers has a fixed ion concentration of at most 6 meq/g H$_2$O, and the second ion exchange layer has a fixed ion concentration higher by at least 0.5 meq/g H$_2$O than the first ion exchange layer.

7. The permselective membrane according to claim 1, wherein at least one side of the ion exchange membrane is roughened, and the roughened surface area is at least 5 times the projected surface area.

8. The permselective membrane according to claim 1, wherein the fluorine-containing polymer has repeating units of the formula:

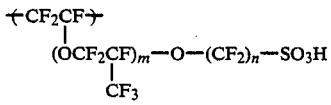

wherein m is 0 or 1, and n is an integer of from 2 to 5.

9. The permselective membrane according to claim 1, wherein the ion exchange membrane is laminated with a porous layer made of a porous material having a pore diameter of from 0.01 to 100 μm and a thickness of from 10 to 500 μm, with its outer and inner walls being hydrophiric.

10. The permselective membrane according to claim 9, wherein the outer or inner wall of the porous material is coated with ion exchange resin having a water content of from 20 to 250% by weight.

11. The permselective membrane according to claim 1, wherein the ion exchange membrane is in the form of a hollow filament.

12. The permselective membrane according to claim 11, wherein the hollow filament is prepared by impregnating a solution of an ion exchange resin having ion exchange groups or groups convertible to ion exchange groups to a hollow filament of a gas permeable porous material and drying it to coat the ion exchange resin on the surface and/or in the porous of the porous hollow filament in an amount of from 1 to 100 g per m$^2$ of the membrane area.

13. A method for selectively permeating water vapor by means of a vapor permselective membrane as defined in claim 1, which comprises contacting a gas containing water vapor to one side of the permselective membrane and contacting a dry gas to the other side of the permselective membrane or reducing the pressure at the other side of the permselective membrane, to selectively permeate water vapor through the permselective membrane.

14. The method according to claim 13, wherein prior to contacting the gas containing water vapor on one side of the membrane and contacting the dry gas to the other side of the permselective membrane or reducing the pressure at the other side of the permselective membrane to selectively permeate water vapor through the permselective membrane, at least one side of the membrane is brought in contact with a dry gas or subjected to evacuation at a temperature of not higher than the glass transition temperature of the permselective membrane, to reduce the moisture content of the permselective membrane to a level of from 1 to 10% by weight.

15. The method according to claim 13, wherein the gas containing water vapor has a temperature of less than 20° C.

* * * * *